United States Patent

Burgess et al.

(10) Patent No.: US 11,055,096 B2
(45) Date of Patent: Jul. 6, 2021

(54) CHECKPOINTING OF ARCHITECTURAL STATE FOR IN ORDER PROCESSING CIRCUITRY

(71) Applicant: Arm Limited, Cambridge (GB)

(72) Inventors: Neil Burgess, Cardiff (GB); Lee Evan Eisen, Round Rock, TX (US)

(73) Assignee: Arm Limited, Cambridge (GB)

( * ) Notice: Subject to any disclaimer, the term of this patent is extended or adjusted under 35 U.S.C. 154(b) by 541 days.

(21) Appl. No.: 15/862,728

(22) Filed: Jan. 5, 2018

(65) Prior Publication Data

US 2019/0213009 A1 Jul. 11, 2019

(51) Int. Cl.
*G06F 9/34* (2018.01)
*G06F 9/38* (2018.01)
*G06F 12/02* (2006.01)
*G06F 9/30* (2018.01)

(52) U.S. Cl.
CPC ...... *G06F 9/30098* (2013.01); *G06F 9/30003* (2013.01); *G06F 9/3826* (2013.01); *G06F 9/3842* (2013.01); *G06F 12/02* (2013.01); *G06F 9/30101* (2013.01); *G06F 9/30105* (2013.01); *G06F 9/384* (2013.01); *G06F 9/3857* (2013.01)

(58) Field of Classification Search
CPC ............ G06F 9/30098; G06F 9/30003; G06F 9/3826; G06F 9/3842; G06F 9/30101; G06F 9/30105; G06F 9/3012; G06F 9/30127; G06F 9/384; G06F 9/3857; G06F 9/3863; G06F 12/02
USPC .................................................. 712/216–219
See application file for complete search history.

(56) References Cited

U.S. PATENT DOCUMENTS

| | | | |
|---|---|---|---|
| 8,078,854 B2* | 12/2011 | Vick | G06F 9/30123 712/218 |
| 9,336,004 B2* | 5/2016 | King | G06F 9/384 |
| 9,471,326 B2* | 10/2016 | Achenbach | G06F 9/384 |
| 10,198,267 B2* | 2/2019 | Airaud | G06F 9/384 |
| 2014/0281402 A1* | 9/2014 | Comparan | G06F 9/3838 712/214 |

* cited by examiner

*Primary Examiner* — Daniel H Phan
(74) *Attorney, Agent, or Firm* — Nixon & Vanderhye P.C.

(57) ABSTRACT

An in-order processor has a mapping storage element to store current register mapping information identifying, for each of two or more architectural register specifiers, which physical register specifies valid data for that architectural register specifier. At least one checkpoint storage element stores checkpoint register mapping corresponding to a checkpoint of previous architectural state. This enables checkpoints to be saved and restored simply by transferring mapping information between the mapping and checkpoint storage elements, rather than transferring the actual state data.

20 Claims, 8 Drawing Sheets

CHECKPOINTING OF ARCHITECTURAL STATE FOR IN ORDER PROCESSING CIRCUITRY

BACKGROUND

Technical Field

The present technique relates to the field of data processing.

Technical Background

Processing circuitry may perform processing of instructions from a given program according to either in-order processing or out-of-order processing. In an in-order processor, the instructions of the program are executed in the same order in which they are defined in the program, so that if an older instruction in the program is stalled, for example because it is waiting for operands to become available, then it is not possible to execute a younger instruction even if the younger instruction does have its operands available. On the other hand, in an out-of-order processor, if an older instruction in the program order is stalled but a younger instruction can execute because all of its operands are available and it is independent of the stalled instruction, then the processor may execute the younger instruction first to avoid wasting cycles when the processor cannot execute the next instruction, and hence improve performance overall. Typically, support for out of order processing requires greater hardware resource to be provided and so to track the out of order completion of instructions it tends to be used on higher performance processor cores while in-order processing tends to be used in smaller, more energy efficient processor cores.

SUMMARY

At least some examples provide an apparatus comprising:
in-order processing circuitry to perform in-order processing of instructions;
a predetermined number of physical registers for storing data for access by the in-order processing circuitry in response to architectural register specifiers specified by the instructions, wherein the predetermined number is greater than a number of architectural register specifiers in a set of architectural register specifiers that are specifiable by the instructions;
a mapping storage element to store current register mapping information identifying, for each architectural register specifier of a subset of said set of architectural register specifiers, which physical register stores valid data corresponding to that architectural register specifier; and
at least one checkpoint storage element to store checkpoint register mapping information corresponding to a checkpoint of previous architectural state, the checkpoint register mapping information identifying, for each architectural register specifier of said subset, which physical register stores previous architectural state corresponding to that architectural register specifier.

At least some examples provide an apparatus comprising:
means for performing in-order processing of instructions;
a predetermined number of means for storing register data for access by the means for performing in-order processing in response to architectural register specifiers specified by the instructions, wherein the predetermined number is greater than a number of architectural register specifiers in a set of architectural register specifiers that are specifiable by the instructions;
means for storing current register mapping information identifying, for each architectural register specifier of a subset of said set of architectural register specifiers, which means for storing register data stores valid data corresponding to that architectural register specifier; and
at least one means for storing checkpoint register mapping information corresponding to a checkpoint of previous architectural state, the checkpoint register mapping information identifying, for each architectural register specifier of said subset, which means for storing register data stores previous architectural state corresponding to that architectural register specifier.

At least some examples provide a method comprising:
performing in-order processing of instructions;
in response to architectural register specifiers specified by the instructions, accessing register data from one of a predetermined number of physical registers, wherein the predetermined number is greater than a number of architectural register specifiers in a set of architectural register specifiers that are specifiable by the instructions;
storing current register mapping information identifying, for each architectural register specifier of a subset of said set of architectural register specifiers, which physical register stores valid data corresponding to that architectural register specifier; and
storing checkpoint register mapping information corresponding to a checkpoint of previous architectural state, the checkpoint register mapping information identifying, for each architectural register specifier of said subset, which physical register stores previous architectural state corresponding to that architectural register specifier.

Further aspects, features and advantages of the present technique will be apparent from the following description of examples, which is to be read in conjunction with the accompanying drawings.

DESCRIPTION OF EXAMPLES

Figure 1:
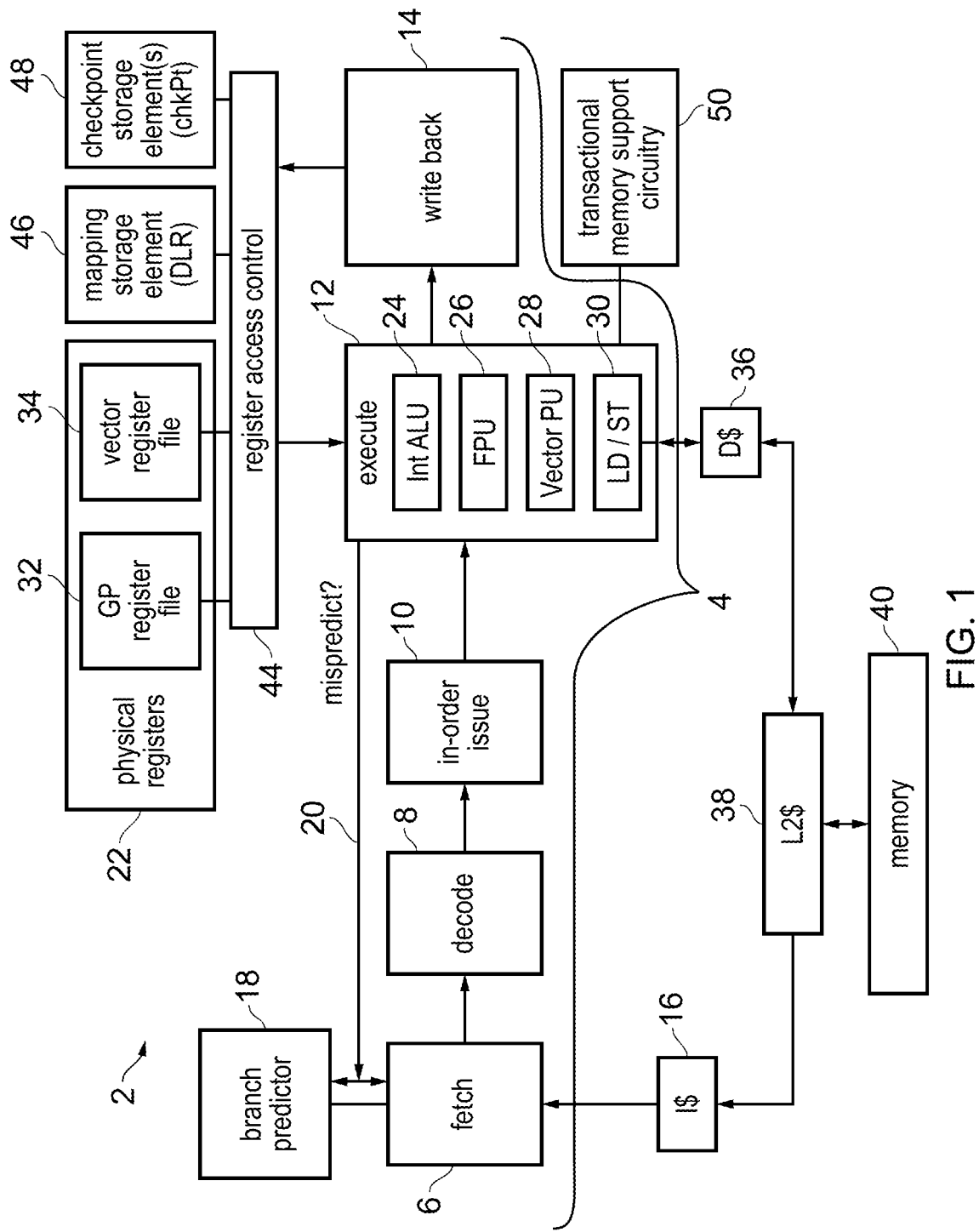
FIG. 1 schematically illustrates an example of an in-order processor.

An apparatus has in-order processing circuitry to perform in-order processing of instructions and a number of physical registers for storing data for access by the in-order processing circuitry in response to architectural register specifiers specified by the instructions. The number of physical registers is greater than the number of architectural register specifiers in a set of architectural register specifiers that are specifiable by the instructions. A mapping storage element stores current register mapping information identifying, for each architectural register specifier in a subset of the set of architectural register specifiers, which physical register stores valid data corresponding to that architectural register specifier. At least one checkpoint storage element is provided to store checkpoint register mapping information corresponding to a checkpoint of previous architectural state. The checkpoint register mapping information identifies, for each architectural register specifier in the subset, which of the physical registers stores the previous architectural state corresponding to that architectural register specifier according to the checkpoint.

Providing such register mapping information which enables the particular physical register mapped to a given architectural register to be varied would be unconventional for an in-order processor. While register renaming may be used in out-of-order processors to remove false address hazards caused by the limited number of architectural register specifiers available and so enables younger instructions to execute ahead of older instructions once the hazard has been removed by remapping the registers, in an in-order processor it is not possible to reorder the execution of younger instructions relative to older instructions and so such register renaming functionality would be seen as having no benefit. However, the inventors recognised that by providing a mapping storage element for mapping each architectural register specifier onto one of a larger set of physical registers and providing at least one checkpoint storage element to store checkpoint register mapping information corresponding to the register mappings captured at an earlier moment in time corresponding to a checkpoint of previous architectural state, this can be beneficial for an in-order processing circuitry to enable previous checkpoints of architectural states to be captured in a more efficient way. Such checkpoints can be captured simply by transferring mapping information between the mapping storage element and the checkpoint storage element, without needing the corresponding register state data itself to be transferred. This can be very useful for supporting functionality such as transactional memory, branch prediction or load speculation which may require previous checkpoints of architectural state to be retained in case speculative processing turns out to be incorrect and the state needs to be rewound to a previous moment of execution.

Control circuitry may be provided for controlling the capture and the restoration of checkpoints based on the checkpoint storage elements. The control circuitry may be responsive to a checkpoint capture event to set the checkpoint register mapping information of a selected storage element to correspond to the current register mapping stored in the mapping storage element. Hence, when a checkpoint needs to be taken, the control circuitry may select one of the at least one checkpoint storage element and copy the current register mapping information specified by the mapping storage element into the selected checkpoint storage element. This allows a checkpoint to be taken without needing to actually transfer any register data other than the mapping information. Typically the mapping information may have a smaller data volume than the register state itself, so this may greatly reduce performance overhead by enabling the checkpoint to be taken much faster as there is less data to copy.

The checkpoint capture event may be any event which requires the current register state to be retained in case it needs to be restored at a later point. In one example, the checkpoint capture event may comprise the execution of a transaction start instruction which represents a start of a transaction comprising one or more instructions executed between the transaction start instruction and a transaction end instruction, for which effects of any instructions within the transaction are to be committed when the transaction end instruction is reached in the absence of an abort event occurring between the transaction start and end instructions. Transactional memory is a technique for resolving conflicts between different threads of processing sharing access to a common resource and it may require the current register state to be captured at the start of the transaction in case an abort occurs during the transaction causing the state to be rewound to the state that was present at the start of the transaction. By using the technique discussed above, the checkpointing at the start of a transaction can be performed faster as it only requires mapping information identifying which physical registers correspond to each architectural register to be transferred, not the register state itself to be transferred.

In another example the checkpoint capture event could comprise a branch prediction being made to trigger speculative execution of instructions by the in-order processing circuitry. The processing circuitry may have a branch predictor for predicting whether the branches should be taken or not taken and triggering fetching and speculative execution of subsequent instructions based on the predicted branch outcome. If a prediction is correct this can lead to faster execution of the program because the subsequent instructions were fetched and executed before the branch outcome was known. However if a branch is mispredicted then speculatively executed instructions may need to be cancelled and state rewound to the architectural state which was present when the branch was encountered. Hence a checkpoint of current register state may be taken when a branch prediction is made and the technique discussed above can make this checkpointing faster.

Another use of checkpointing may be for load speculation, so that when a cache miss slows up one particular load operation, subsequent load instructions or arithmetic/logic instructions may be executed speculatively assuming a predicted value for the stalled load, and a checkpoint may be taken so that state can be restored to the checkpointed values if it turns out the prediction was incorrect. Hence, the checkpoint capture event could be a load value prediction being made to trigger speculative execution of instructions by the in-order processing circuitry.

In a corresponding way, the control circuitry may be responsive to a checkpoint restore event to set the current register mapping information stored in the mapping storage element to correspond to the checkpoint register mapping information of a selected checkpoint storage element. Hence, when the checkpoint needs to be restored, the mapping information can be copied from the selected checkpoint storage element to the mapping storage element, to restore the register mapping which was previously captured. As the physical register file has a greater number of registers than the number of architectural register specifiers available, this means that the checkpoint of register state can still be present within the physical register file and so by restoring the register mappings back to the previous state represented by the checkpoint register mapping information this effectively means that subsequent instructions will see the architectural state that was pending at the time when the checkpoint was taken. Again, such rewinding of architectural state based on switching register mapping information would be unconventional in an in-order processor, which would not be expected to have functionality for remapping which physical registers are accessed for a given architectural register specifier.

Again, the particular event which triggers restoration of a checkpoint may vary. In one example the checkpoint store event could comprise an abort event occurring during processing of a transaction. For example the abort event could be detection that another process has accessed the same shared resource that is accessed in the transaction, that the transaction included at least one type of program instruction which is not allowed to be executed within a transaction, or that transaction handling resources such as entries in a buffer for tracking the memory addresses is accessed within the transaction for the purposes of detecting conflicts with other processes have been exhausted so that it is not possible to support continued processing of the transaction. The precise cause of the abort event may vary, but in general if a transaction is aborted for any reason, then the control circuitry may restore the previous processor state which was pending at the time of the transaction start instruction, by setting the current register mapping information to be equal to the checkpoint register mapping information stored in the selected checkpoint storage element.

Alternatively, the checkpoint register store event could comprise a branch misprediction or load value misprediction being detected, if the checkpoint was captured in response to a branch prediction or load value prediction being made.

In some examples, the subset of architectural register specifiers covered by the mapping storage element and at least one checkpoint storage element could comprise the entire set of architectural register specifiers that are specifiable by the instructions. Hence, all architectural registers of the instruction set architecture could be duplicated in the physical register file, and each of the architectural register specifiers in the set could have corresponding fields of the current and checkpoint register mappings for specifying which of the physical registers should be used to provide the current valid architectural state and the checkpoint state respectively.

However, in other examples the mapping storage element and checkpoint storage element could cover a reduced subset of the full set of architectural register specifiers specifiable by instructions in the instruction set architecture supported by the in-order processing circuitry. Hence, the subset of architectural register specifiers covered by the mapping storage element and the at least one checkpoint storage element could be a proper subset of the set of architectural register specifiers (a subset which excludes at least one member of the full set of architectural register specifiers).

For example, in a system using the checkpoints for supporting transactional memory as discussed above, some implementations may choose to trade off circuit area against processing performance by reducing the number of architectural registers which are allowed to be used during a transaction. For instance, instead of using all architectural registers R0-R31, the transaction may only be able to use a reduced subset R0-R15. While this could increase register pressure in the transaction, increasing the likelihood of register hazards in an in-order core, and hence may reduce performance, it can enable less circuit area to be expended as fewer physical registers may be needed (it is not necessary to provide multiple physical registers corresponding to an architectural register specifier outside the subset), and the checkpointing logic can be less complex as fewer registers need to be checkpointed and restored and the mapping storage element and checkpoint storage element may only include enough fields for indicating a register mapping for the architectural register specifiers in the subset. With such an implementation, an attempt to execute an instruction during processing of a transaction which specifies one of the architectural registers outside the allowed subset could trigger an abort of the transaction.

The apparatus may have control circuitry for controlling writing of data to the physical registers in response to the instructions executed by the in-order processing circuitry. For any architectural registers not in the subset covered by the mapping storage element and at least one checkpoint storage element, register writes may always target the same physical register. However, for the architectural register specifiers in the subset, once the checkpoint has been taken, the control circuitry may control the selection of registers to be written to in response to subsequent instructions, so that a previous checkpoint of register states is not overwritten. Hence, the control circuitry may switch which register maps to a given architectural register the first time that the given architectural register is written to after the checkpoint has been taken, so that subsequent writes to that architectural register specifier are directed to a different physical register to the one previously mapped to the architectural register specifier, and so the previous value of architectural state stored in the old physical register can be retained in the register file as checkpoint state.

Hence, in a non-checkpoint mode (e.g. when no checkpoint has yet been taken), the control circuitry may respond to execution of an instruction specifying a destination architectural register specifier of the subset covered by the checkpoint, to control a result of the instruction to be written to the physical register which is identified by the current register mapping information in the mapping storage element as storing the valid data for the destination architectural register specifier. Hence, when no checkpoint has yet been taken, the register writes target the physical register mapped to the destination architectural register specifier in the current register mapping information.

On the other hand, in a checkpoint mode (e.g. when at least one checkpoint of past register state has been taken and not yet restored), when an instruction is executed which specifies a given destination architectural register specifier of the subset covered by the checkpoint, the control circuitry may detect whether the physical register specified for that destination architectural register specifier by the current register mapping information is equal to the physical register specified for the destination architectural register specifier by the checkpoint register mapping information stored in the most recently updated checkpoint storage element. If the current register mapping information and the checkpoint register mapping information in the most recently updated checkpoint storage element both specify the same physical register for the destination architectural register specifier, then this is the first write to that destination architectural register specifier since the checkpoint was taken, and so it would not be desirable to overwrite the value in the physical register indicated in the current register mapping, as this would result in the checkpoint state being lost. Hence, the control circuitry may control a result of the instruction to be written to an available physical register which is not currently mapped to any architectural register by the current register mapping information or the checkpoint register mapping information stored in any checkpoint storage element. Also, the current register mapping information may be updated to specify the physical register selected as the available physical register for writing the data, so that physical register is now indicated as storing the valid data corresponding to the destination architectural register specifier. Hence, the first write after a checkpoint is taken is written to a different physical register currently indicated as matching the destination architectural register, and then the current register mapping information is updated to point to that new physical register. This means that the old checkpoint value can be retained within the physical register file and not overwritten.

On the other hand, if in the checkpoint mode the physical register specified by the current register mapping information is different to the physical register specified for the destination architectural register specifier by the checkpoint register mapping information in the most recently updated checkpoint storage element, then the result of the instruction is written to the physical register identified by the current register mapping information for the destination architectural register specifier. In this case there is no need to update the current register mapping information. This scenario may occur for the second, third or subsequent register writes to the destination architectural register specifier after a given checkpoint has been taken.

In summary, by controlling which register the result of the instruction is written to following taking of a checkpoint, depending on whether the current register mapping matches the checkpoint register mapping, this can enable the checkpoint to be safely retained within the register file, so that this supports the ability to save and restore checkpointed register states by transferring register mapping information between the mapping storage element and the checkpoint register mapping storage elements as discussed above.

Whether the system is in the checkpoint mode or non-checkpoint mode could be identified from a valid bit or other checkpoint status bit indicating whether a checkpoint has been taken and could still be potentially restored. Alternatively, the control circuitry could implicitly determine whether the system is in the checkpoint mode or non-checkpoint mode from other information (e.g. in systems supporting transactional memory, a status indication indicating whether processing in a transaction is being performed).

The particular way in which the mapping information identifies which registers are used for each architectural register specifier can vary. In some cases a general mapping scheme may be used where the mapping information used specifies the entire physical register number mapped to the corresponding destination architectural register specifier. In this case, it may be possible to map any of the physical registers to any of the architectural registers specifiers using both the current register mapping information and the checkpoint register mapping information. However, this may require more complex logic for indexing into the physical register file, and this may not be justified especially given than an in-order processor may typically be relatively area and energy efficient and so it may not be desirable to incur greater cost than necessary in the register mapping logic.

A more efficient scheme can be to divide the physical register file (or at least the portion of the physical register file corresponding to the subset of architectural registers covered by the checkpointing) into sets of registers each comprising N registers, where N is greater than or equal to 2 and is less than the total predetermined number of physical registers. For each architectural register specifier of the subset, the corresponding architectural state data can be stored in one of N alternative physical registers and cannot be stored in any physical register other than those N registers. The group of N registers to use for a given architectural register specifier may be selected based on the architectural register specifier.

Hence the current register mapping information may comprise a number of mapping values, which each specify for a corresponding architectural register specifier one of the N alternative physical registers that stores the valid data for the corresponding architectural register specifier, and the checkpoint register mapping information may have a similar format. By limiting the set of physical registers that can store the data value for a given architectural register, this can make the circuitry for indexing into the required registers more efficient, and reduce the size of the mapping values, as they may require fewer bits to indicate one of the N registers than if they had to indicate a register from the entire set of physical registers. When indexing into the physical register bank, the mapping value specified for the corresponding architectural register specifier in the current register mapping information could be used as additional bits to be concatenated with the architectural register specifier itself, in order to select the particular physical register that is accessed.

When each architectural register specifier of the subset can map to any one of a set of N alternative physical registers, then this may allow up to N−1 different checkpoints of register state to be stored. Hence, the apparatus may in some implementations have a maximum of N−1 checkpoint storage elements.

Although N can be any number of two or greater, and in some cases multiple checkpoints may need to be stored simultaneously, it may be most area efficient for N to equal 2 in which case a single checkpoint may be taken at a given time. With N=2, the control over register writes can be simpler because when writing to a given destination architectural register specifier of the subset in the checkpoint mode, the control circuitry may simply check whether the current register mapping information and the checkpoint register mapping information specifies the same register for the destination architectural register specifier, and if so then the result of the instruction can be written to the other physical register in the set of two available physical registers for the destination architectural register specifier, and the current register mapping information can be updated to invert a bit flag which specifies which of the two alternative physical registers is used to store the valid data for the destination architectural register specifier. When N=2, each mapping value in the set of mapping information maintained in the mapping storage element and the checkpoint mapping information for each checkpoint storage element can be implemented as a single bit flag, which results in very low overhead. The transfer of the entire set of mapping information between the mapping storage element and the checkpoint storage element can simply transfer one bit per architectural register specifier, which may be much more efficient then transferring a larger number of bits (e.g. 32 or 64) per architectural register specifier, as would be needed if all the architectural state data itself had to be copied when taking or restoring a checkpoint.

Hence, as discussed above, in some cases there may only be a single checkpoint storage element provided for storing checkpoints register mapping information. Alternatively, some systems may support multiple checkpoint storage elements so that checkpoints corresponding to different moments of execution of the program can be captured simultaneously. The physical registers may comprise at least $(M+(-1)*R)$ physical registers, where M is the total number of registers in the set of architectural register specifiers, R is the number of registers in the subset of architectural registers covered by the checkpointing, and N≥2. In systems where the entire set of architectural registers is covered by the checkpointing (M=R), then the physical registers may comprise at least N times as many physical registers as the number of architectural registers specifiers that are specified by the instructions.

FIG. 1 schematically illustrates an example of a data processing apparatus 2 having an in-order processing pipeline 4 comprising a number of pipeline stages including a fetch stage 6, a decode stage 8, an issue stage 10, an execute stage 12 and a write back stage 14. The fetch stage 6 fetches instructions from an instruction cache 16. The fetch stage 6 is provided with a branch predictor 18 for predicting whether the instructions from the fetch addresses being processed in a current cycle include a branch, and if so, whether the branch is predicted taken or not taken. The branch predictor may also predict other aspects of branch outcomes such as the branch target address. Following fetching of an instruction predicted to be a branch, the fetch stage 6 may continue to fetch subsequent instructions following either sequentially from the branch instruction itself in the case of a not taken prediction or following from the branch target address in the case of a taken prediction. Either way the instructions following the branch are fetched, decoded and executed speculatively, until the branch outcome is known. A misprediction signal 20 may be sent back to the branch predictor 18 or the fetch stage 6 if the execute stage 12 determines that a branch has been incorrectly predicted, and in this case the branch predictor state may be updated to reduce the chance of a misprediction in future, and fetching may be restarted from the correct instruction following the branch.

The decode stage 8 decodes the instructions fetched by the fetch stage 6 to generate control signals for controlling subsequent stages to perform the processing operations represented by the instructions. The issue stage 10 buffers decoded instructions while waiting for their operands to become available in a physical register file 22. The issue stage is an in-order issue stage, which in each cycle issues the oldest remaining instruction, and cannot issue any younger instructions until the oldest remaining instruction has been issued. Once an instruction operands are available, and that instruction has become the oldest instruction still to be issued, and resource is available in the execute stage 12, then the issue stage 10 issues the instruction for execution.

The execute stage 12 obtains any operands required for the instruction from the physical register file 22 and executes the instruction using one of a number of execution units 24 to 30. In this example the execution units include an integer ALU (arithmetic/logic unit) for performing arithmetic or logical operations on integer operands from the general purpose registers 32 within the physical registers 22, a floating point unit 26 for executing operations involving floating-point operands read from the general purpose registers 32, a vector processing unit 28 for performing vector operations using vector operands read from vector registers 34 (vector operands include multiple independent data elements within the same operand), and a load/store unit 34 transferring data values between the register file 22 and a memory system. The memory system may comprise the instruction cache 16, a data cache 36, a shared level two cache 38 which is shared between instructions and data, and main memory 40. It will be appreciated that this is just one possible implementation of the memory system and that other implementations are possible. The results of instructions executed by the execute stage 12 are written back to the registers 22 by a write back stage 14.

It will be appreciated that this is a simplified diagram of one example of a potential processor pipeline architecture, but other implementations are also possible and the pipeline may include additional pipeline stages or additional circuit elements not shown in FIG. 1.

The physical register file 22 may be separated into separate register files such as a general purpose register file 32 and the vector register file 34. The general purpose register file 32 can be used for storing integer or floating point values, or for storing control state information for controlling the operation of the pipeline (such as a program counter representing the address of the current point of execution reached in the program, a stack pointer address representing the location in the memory system of a stack data structure, or other control values such as condition status codes indicating properties of previous processing results which can be used for evaluating whether conditional instructions need to be executed). The vector register file 34 may store not only the vector operands themselves, but also predicate values (mask values) for indicating which elements of vector operands should be operated on by the execute unit 12. It will be appreciated that in practice the particular registers provided may depend on the instructions that architecture implemented by the pipeline 4.

Register access control circuitry 44 is provided to control access to the physical registers based on mapping information stored in a mapping storage element 46 and checkpoint mapping information stored in one or more checkpoint storage elements 48. This is useful for enabling the system to capture a checkpoint of previous architectural state and retain it within the physical register file 22 in case it later needs to be restored. One reason for taking a checkpoint may be a branch prediction being made by the branch predictor 18, so that if the execute stage 12 later determines that the branch was mispredicted then the contents of the physical registers 22 can be restored back to their previous value as represented by their checkpoint storage element 48.

Another potential reason for capturing a checkpoint of previous architectural state may be the execution of a transaction in a system supporting transactional memory. As shown in FIG. 1, the execute stage may be provided with transactional memory support circuitry 50 providing various execution resources for supporting the execution of transactions. A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

Figure 2:
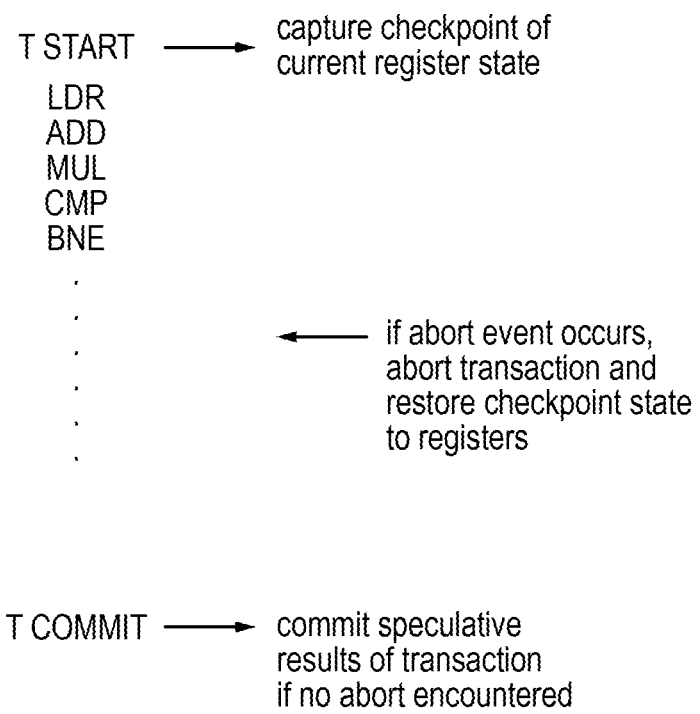
FIG. 2 shows an example of a transaction comprising a number of instructions executed speculatively between a transaction start instruction and a transaction end instruction.

A more optimistic approach for handling conflicts between threads accessing shared resources can be to use transactional memory support. As shown in FIG. 2, a data processing system may have circuitry to support execution of a transaction within a thread of data processing by the processing circuitry. The transaction may be those instructions of the thread which are executed between a transaction start instruction marking (TSTART) the beginning of the transaction and a transaction end instruction (TCOMMIT) marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

The transactional memory support circuitry may include a number of forms of resource. Firstly the mapping storage element 46, checkpoint storage element(s) 48, and register access control circuitry 44 for taking checkpoints of register state may themselves be regarded as a form of transactional support circuitry since they enable a snapshot of architectural state to be captured at the start of the transaction in case it needs to be restored if the transaction is aborted. However in addition to this checkpointing, in another example, the transactional memory support circuitry 50 may comprise conflict detection circuitry to detect conflicts between a data access to a given address made within a transaction of a first thread and a data access to the same address made by another thread (either within a transaction or in a non-transactional thread). For example, address tracking circuitry may be provided to track the addresses accessed by instructions within a transaction. The conflict detection circuitry may detect conflict when another thread (whether executing on the same processor core or on a different core in a multi-core system) accesses one of the addresses recorded in the address tracking circuitry. When a conflict is detected, the conflict detection circuitry may trigger an abort of the transaction of the first thread for which the addresses are being tracked.

The transactional memory support circuitry 50 could also include circuitry for detecting other events which may cause aborting of a transaction. For example, on receipt of an interrupt, the transaction could be aborted. Also a transaction may be aborted if the transactional memory support circuitry runs out of resources (e.g. if a number of addresses tracked by the address tracking circuitry exceeds the capacity available within the storage provided), so that it is no longer possible to guarantee that the transaction will proceed correctly without conflict. Also, certain types of instruction may be inappropriate for being processed within a transaction and on encountering a type of instruction not allowed within a transaction, the transaction may be aborted. On aborting a transaction, it may be up to software to determine whether to try to execute the transaction again or to execute an alternative code path using a non-transaction based mechanism such as using locks.

Normally, in an in-order processor supporting transactional memory, one would expect that to capture the checkpoint of the current register state in response to the transaction start instruction TSTART, it would be necessary to copy all of the architectural state data from the physical register file 22 to another storage location, such as a second set of registers or a memory system, and then on restoring a checkpoint they would need to be copied back. However the number of architectural registers available in the instruction set architecture may be large and so this copying of states data may take a long time.

Figure 3:
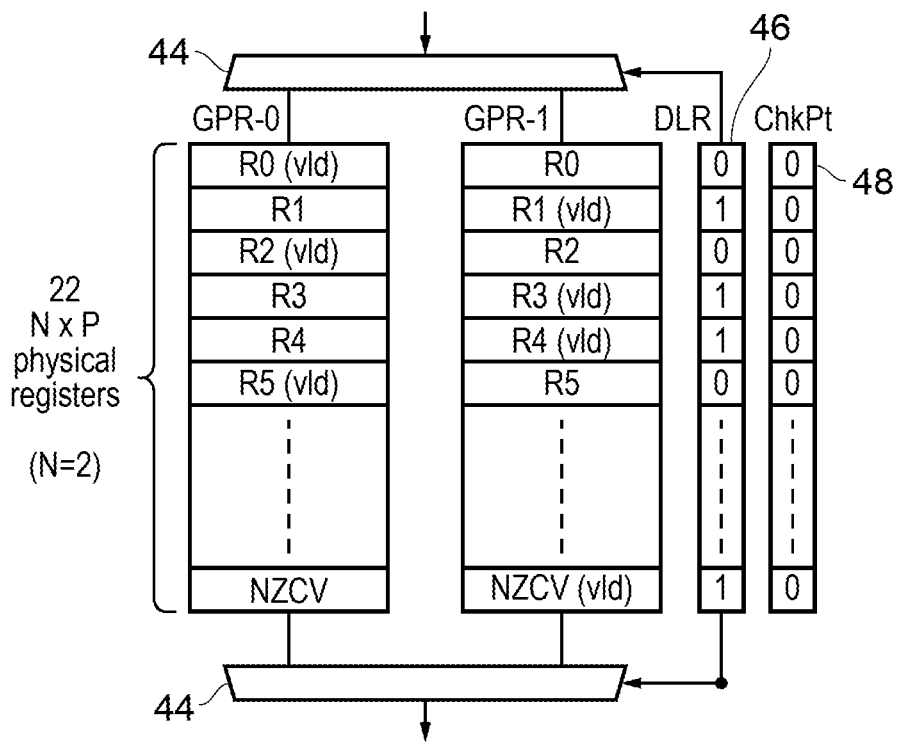
FIGS. 3 to 8 show an example of saving and restoring checkpoints of previous architectural state using a mapping storage element and a checkpoint storage element.

As shown in FIG. 3, by using the mapping storage element 46, the check point storage element 48, and a physical register file 22 which includes a greater number of physical registers than the number of architectural registers specifiers that are specifiable by instructions according to the supported instruction set architecture, this can enable saving and restoration of checkpoints to be performed more quickly to improve performance. FIG. 3 shows an example where the number of physical registers is N×P, where P is the number of architectural registers that are specifiable in the architecture and in this example N=2. For conciseness FIG. 3 only shows an example using the general purpose registers 32, but the vector registers can be duplicated in a similar way in physical registers provided in hardware. Each architectural register specifier (e.g. R0, R1, R2, etc.) can be mapped to one of two alternative physical registers by the register access control circuitry 44. Current register mapping information in the mapping storage element 46 (also known as data location register or DLR) identifies which of the pair of alternate physical registers stores the valid data value for a given architectural register specifier. For example, in the case shown in FIG. 3 general purpose registers R0, R2 and R5 are valid in register group 0 while general purpose registers R1, R3 and R4 are valid in register group 1, as indicated by the corresponding mapping bit in the DLR 46. Multiplexers 44 provided as the register access control circuitry can select which physical register a register read or register write acts upon, based on the bit in the DLR 46.

Figure 4:
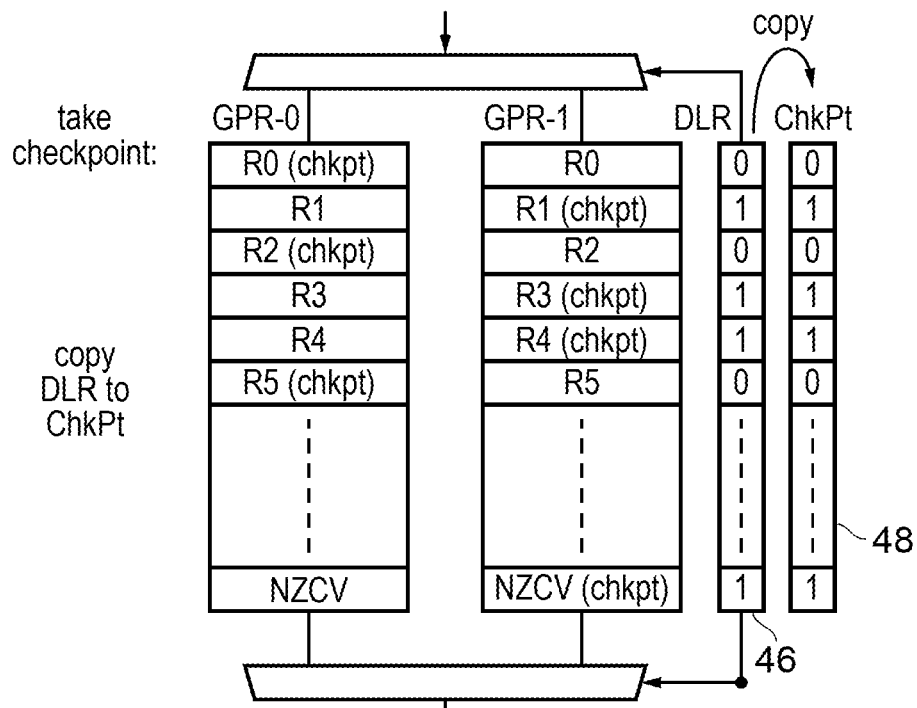

As shown in FIG. 4, when a checkpoint is to be taken, then the register access control circuitry simply copies the current values from the DLR 46 into the checkpoint storage element 48 so that the checkpoint mapping information becomes the same as the current register mapping information. Therefore whatever values were in the physical registers indicated as valid in the DLR become the checkpoint state.

Figure 5:
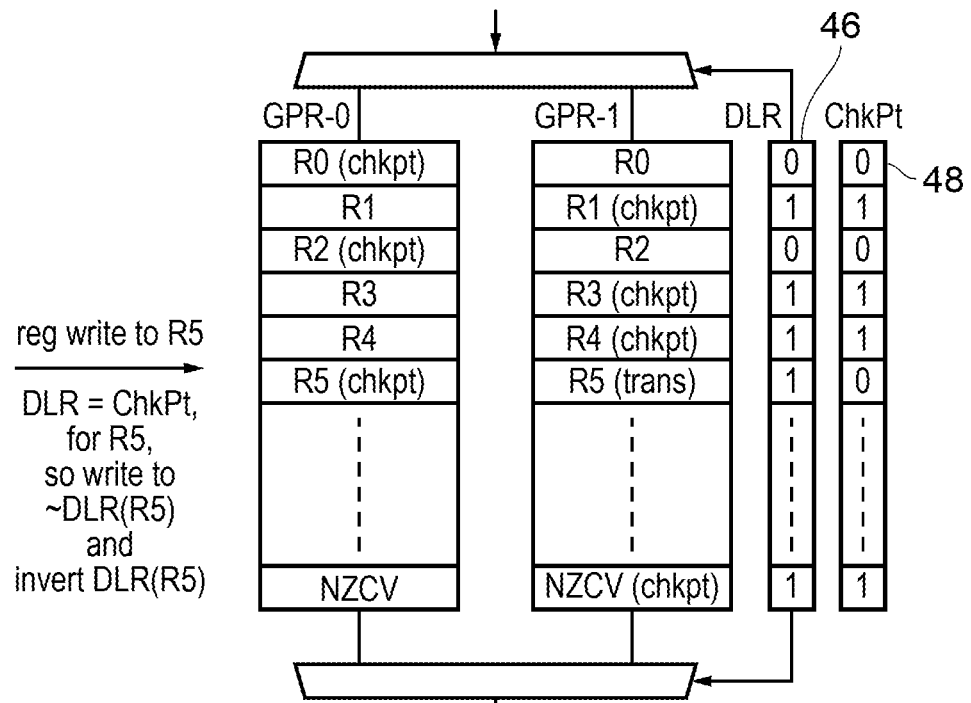

As shown in FIG. 5, when a write to a given destination architectural register specifier (e.g. register specifier R5) is performed by the write back stage 14, then the register access control circuitry 44 determines whether the DLR 46 and checkpoint storage element 48 specify the same physical register for the destination architecture register specifier R5. In this example, following the updates made in FIG. 4 DLR specifies that the current checkpoint value for R5 is within register 0, and the checkpoint storage element 48 also specifies that the value for R5 is in register 0, and so this means that no write to R5 has taken place since the checkpoint was taken. Therefore, relative to FIG. 4 the register access control circuitry 44 inverts the current value of the mapping value in the DLR 46 corresponding to architectural register R5, so that it now points to GPR-1, and writes the new value for register R5 (based on the outcome of the corresponding instruction executed by the pipeline) to the newly mapped register in GPR-1, retaining a previous value of the checkpointed architectural state in GPR-0.

Figure 6:
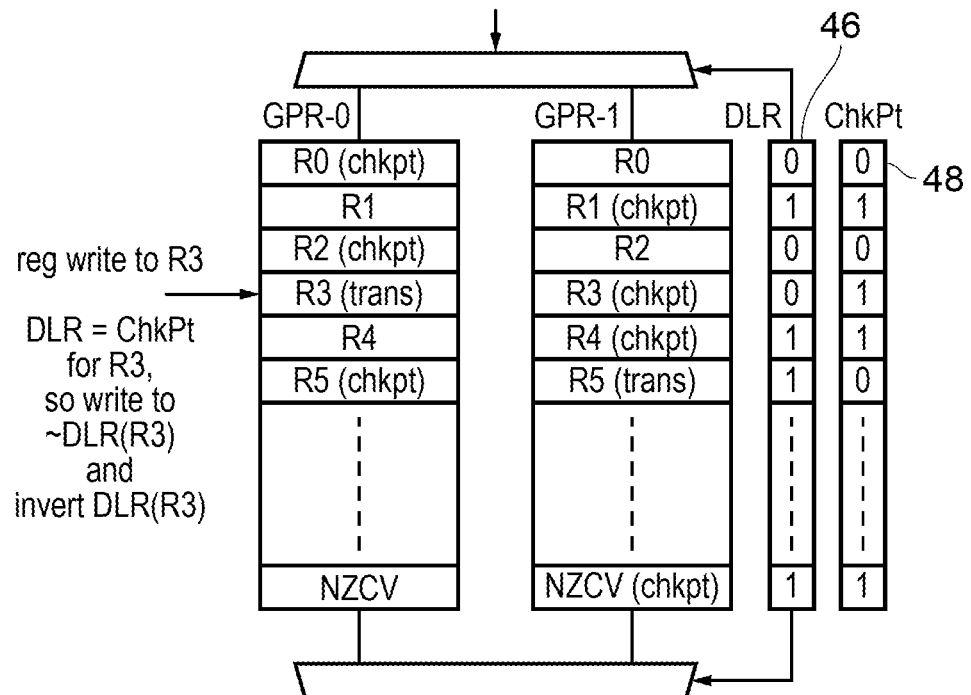

Similarly, as shown in FIG. 6, if there is a register write to architectural register R3, then as the current register mapping in DLR 46 and the checkpoint register mapping in the checkpoint storage element 48 in the state shown in FIG. 5 were equal, then this leads to the result being written to the opposite (GPR 0) register to the one currently mapped in DLR, and to the DLR value being inverted, so that it now points to GPR 0. Hence, as processing of the transaction continues the current register state may be retained within one of the pair of alternate registers available for each architectural register specifier, and the checkpoint state is retained in the other.

Figure 7:
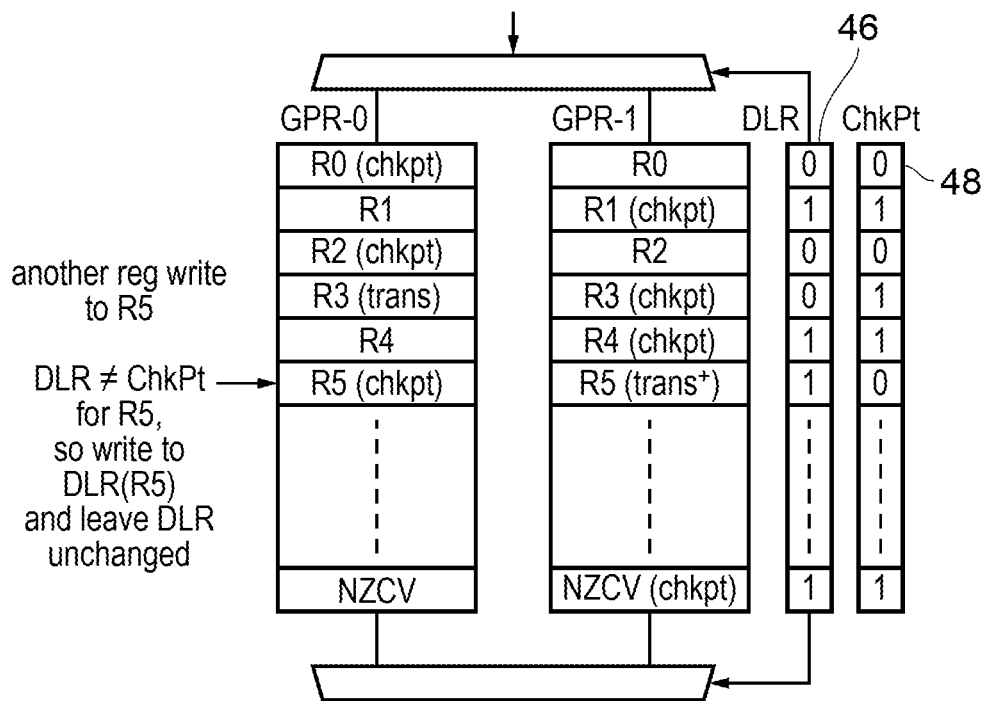

As shown in FIG. 7 if there is another register write targeting architectural register R5 as the destination register, then this time as the mapping value in the DLR 46 does not match the checkpoint mapping value in the checkpoint register 48, the result of the executed instruction is written to the register indicated by the DLR without changing the DLR value. Hence, each successive write (other than the first write since the checkpoint was taken) to the same architectural register will carry on updating the same physical register, so as to preserve the checkpoint value in the opposite register of the two values available for that architectural register.

Figure 8:
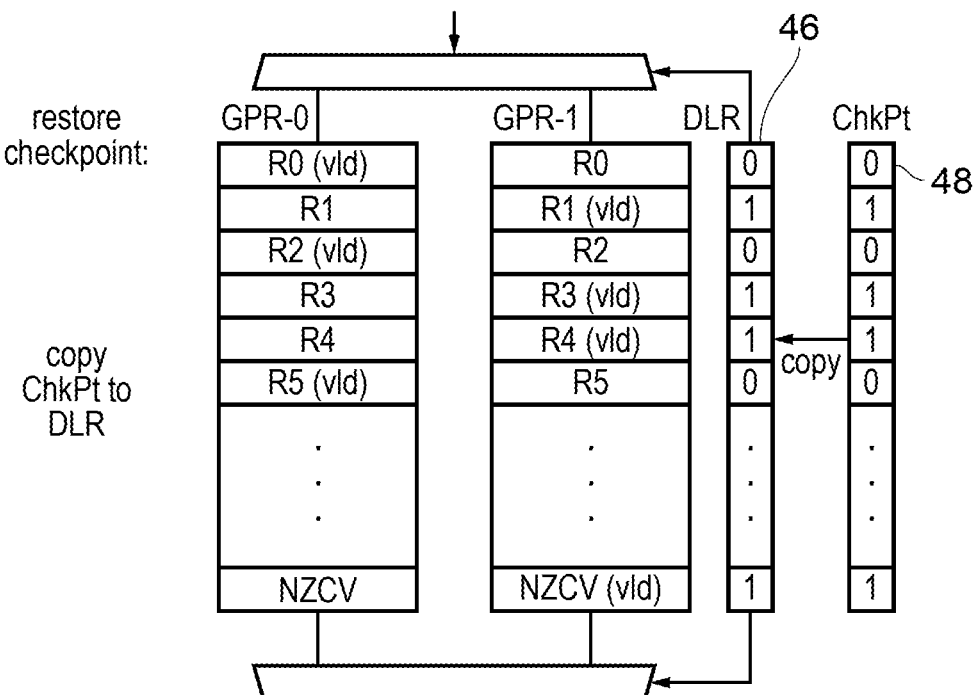

As shown in FIG. 8, if a transaction is aborted and a previously captured checkpoint needs to be restored, then the checkpoint register mapping bits can simply be copied back from the checkpoint register 48 into the DLR 46 to return the current register state to the values which were present when the transaction was started. Processing then continues based on the valid values in those registers. Note that the architectural state shown as valid in FIG. 8 is the same as that which was valid in FIG. 3. On the other hand, if the transaction end instruction is reached without an abort, then the check point mappings can be discarded, and so the checkpoint mapping information in checkpoint storage element 48 can be overwritten.

The bit shown for each architectural register in the DLR 46 may effectively be used as an additional bit in the register index supplied to the register file to select which of the two alternate registers in the physical register file used in that destination architectural register, and this can be remapped in order to change the valid register without actually transferring any data. This means that checkpoints capture and restoration can be performed simply by transferring single bit flags between the DLR 46 and the checkpoint register 48, without actually transferring any data between the larger physical registers. While FIGS. 3 to 8 only shows the technique being applied to the general purpose registers it can also be used for the vector registers. It is also not essential to duplicate all architectural registers using multiple physical registers—if any architectural registers do not need to be retained in the checkpoint, only one physical register could be provided for storing that state, and no corresponding field is needed in the DLR 46 and checkpoint 48 registers.

Figure 9:
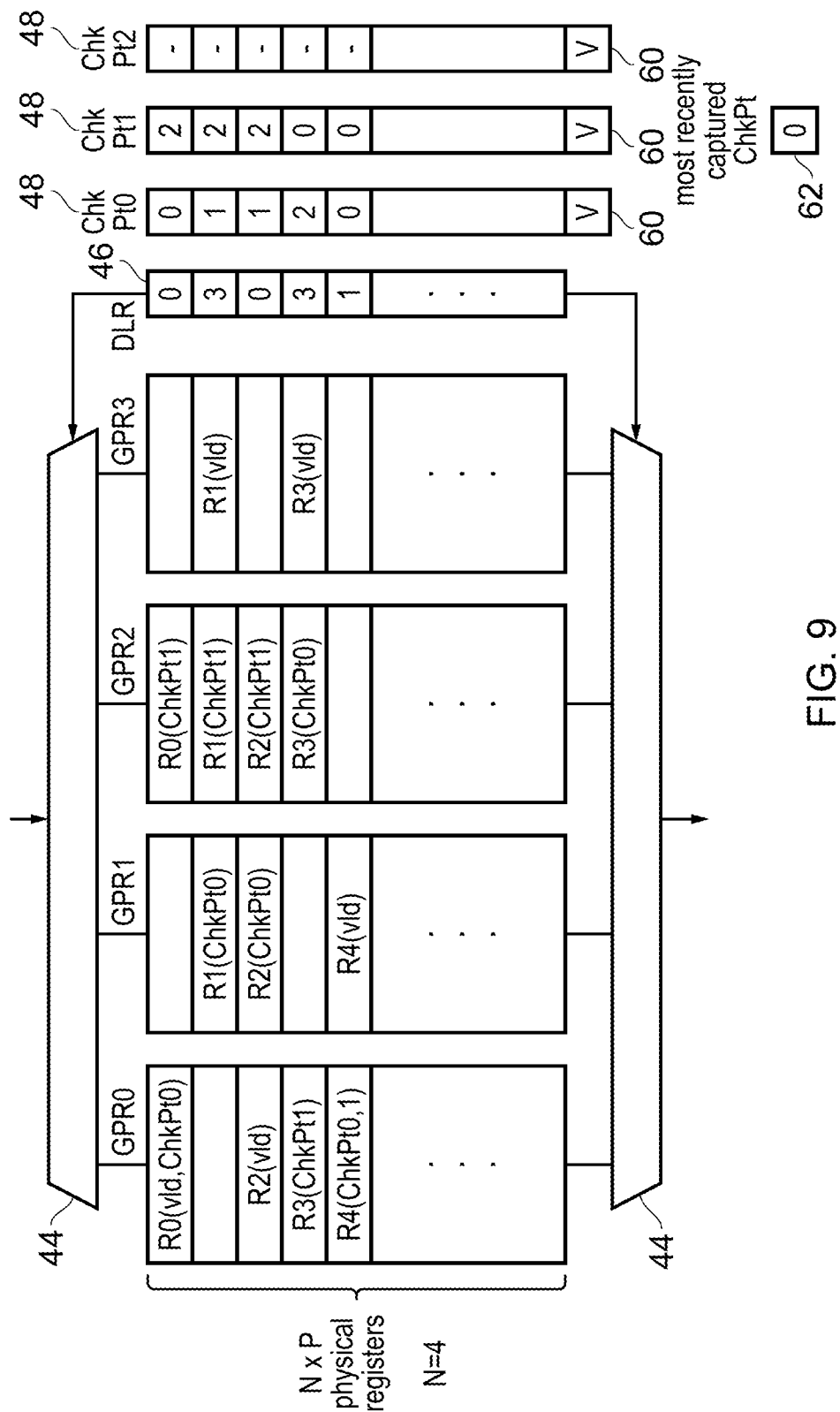
FIG. 9 shows another example in which multiple previous checkpoints can be retained simultaneously.

While the example of FIGS. 3 to 8 shows a single checkpoint storage element (which in practice may often be enough for in-order processor cores which may often prioritise energy efficiency over performance), as shown in FIG. 9 it is also possible to provide multiple check point storage elements so that several independent checkpoints of register state can be captured at the same time. In this example N=4, so there are four times as many physical registers as the number of architectural registers in the instruction set architecture. Hence, each field of the DLR 46 may include a multi-bit (in this example 2-bit) value distinguishing which of the N alternative registers should be used for providing the valid value of the corresponding architectural register. Up to N−1 checkpoint registers 48 can be provided for storing different checkpoints of register state. A valid bit 60 associated with each checkpoint register may indicate which of these is valid. Register control circuitry 44 may maintain a most recently captured checkpoint identifier 62 which indicates which of the checkpoint registers indicates the most recently captured checkpoint. This can be useful for controlling the location of register writes based on whether the valid state has been updated since the last checkpoint has taken. As shown in the example of FIG. 9, sometimes the valid state may still remain the same as one of the previously captured checkpoints as shown in the example of architectural register R0 which is still the same as the checkpoint state for checkpoint 0. Also as shown for architectural register R4, sometimes multiple checkpoints may point to the same register for a given architectural register but may be different for other registers.

To capture a checkpoint, the example of FIG. 9 functions in a similar way to the one shown above, in that the contents of the DLR are simply copied to one of the checkpoint registers 48 which is currently invalid. As register writes are performed, if the DLR for the destination architectural register specifies the same register as the most recently captured checkpoint register 48, then the current mapping in the DLR is updated to point to one of the other registers in the set corresponding to the destination architectural register specifier which is not currently mapped to that destination register in any of the DLR or any of the checkpoint registers 48, and the result value written to that newly mapped physical register. On the other hand if the DLR is already different to the most recently captured checkpoint for the destination architectural register, then the register write simply targets the register currently indicated in the DLR as being mapped to that destination architectural register. On register reads, the read data is simply obtained from one of the corresponding set of N physical registers indicated by the DLR as providing the valid data for the required source architectural register specified by an instruction to be executed.

Figure 10:
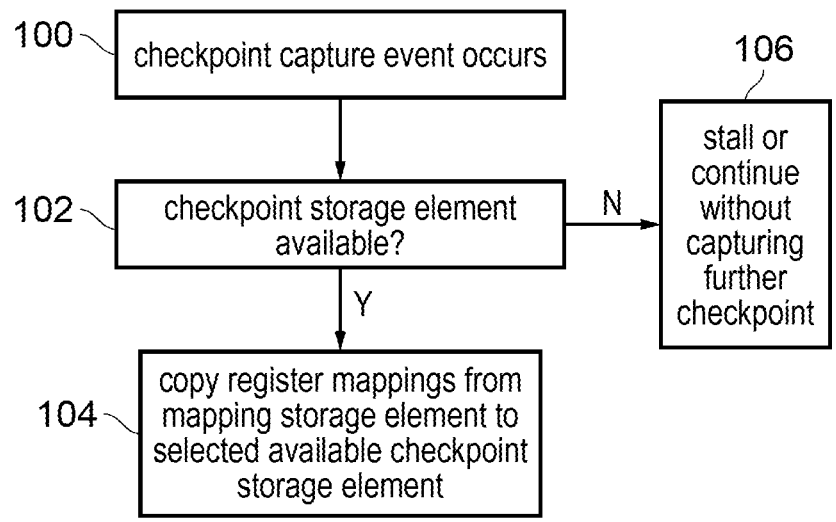
FIG. 10 is a flow diagram showing a method of capturing a checkpoint of previous architectural state.

FIG. 10 illustrates a flow diagram showing a method of capturing a checkpoint. At step 100 a checkpoint capture event is detected by the register access control circuitry 44 (or by other circuitry associated with the pipeline, which signals to the register access control circuitry that a checkpoint needs to be taken). For example, the checkpoint capture event could be the execution of a transaction start instruction, or the making of a branch prediction. At step 102 the register access control circuitry 44 determines whether there is a checkpoint storage element available for storing a checkpoint. If so, then at step 104 the register mapping data is copied from the mapping storage element 46 to an available checkpoint storage element 48. If there is no checkpoint storage element available, then at step 106 either processing can be stalled or processing may continue without capturing a further checkpoint (in this case if state needs to be restored then a previous checkpoint can be used and in this case processing may have to rewind to a point earlier than the point at which the current checkpoint capture event occurred).

Figure 11:
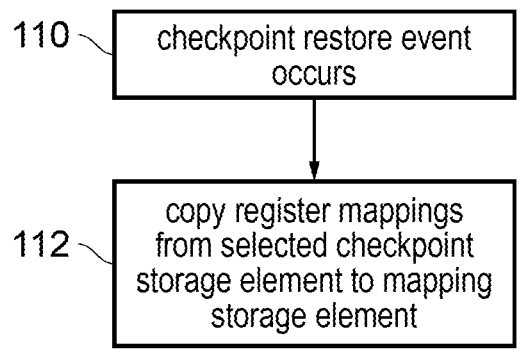
FIG. 11 shows a flow diagram illustrating a method of restoring a previously captured checkpoint of architectural state.

FIG. 11 shows a flow diagram illustrating a method of restoring check point data. At step 110 a checkpoint restore event is detected. For example this could be a branch misprediction being detected or could be an abort event occurring during processing of a transaction. At step 112 the checkpoint data is restored by copying the register mappings from a selected checkpoint storage element 48 to the mapping storage element 46. In embodiments with multiple checkpoint storage elements the selected checkpoint storage element may be the one determined to provide the checkpoint data which corresponds to the point of execution to be restored. For example if multiple checkpoints are captured for each branch predicted, some data may be stored tracking which checkpoint corresponds to each branch, so that the relevant checkpoint associated with the mispredicted branch can be restored.

Figure 12:
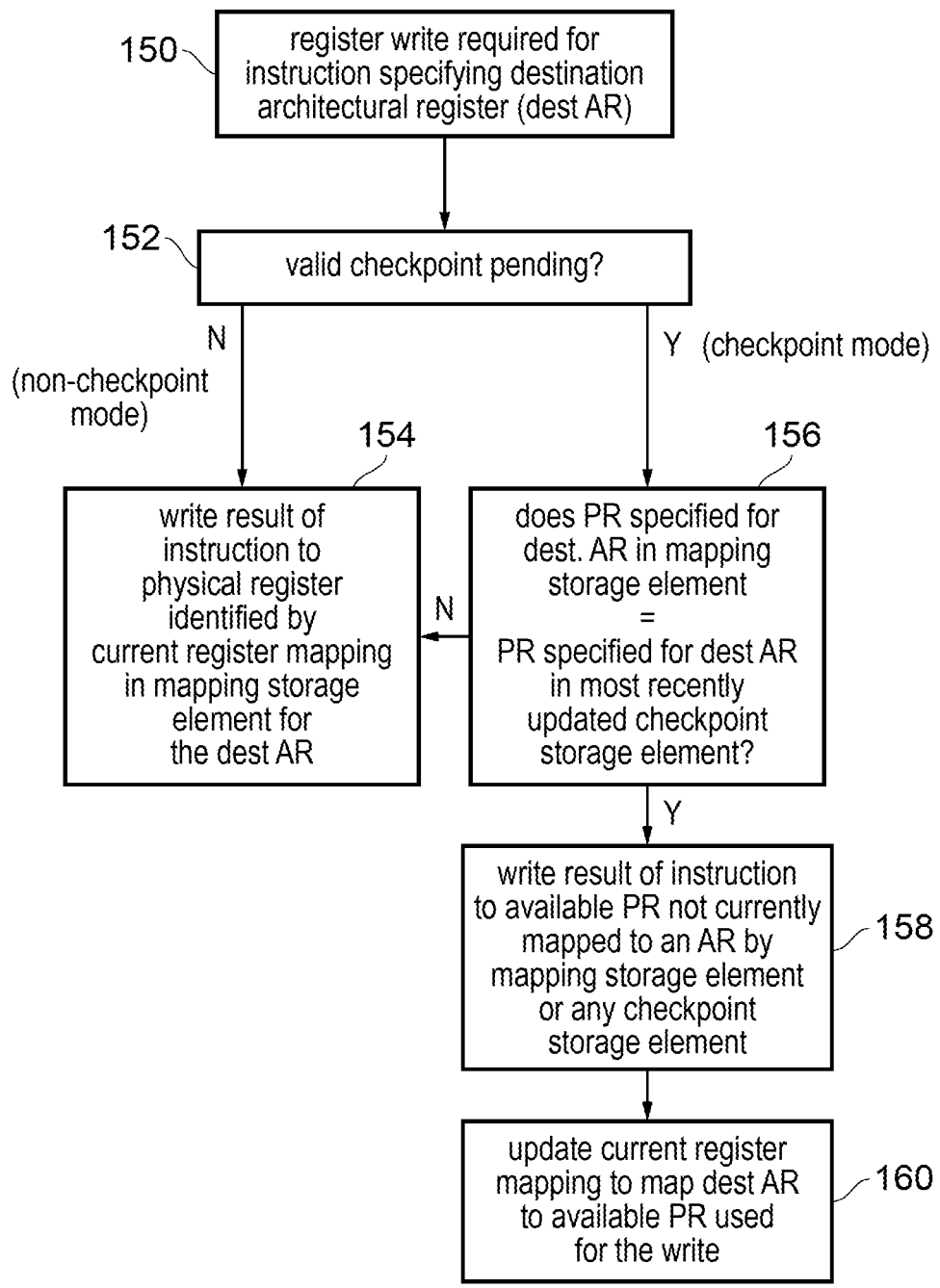
FIG. 12 shows an example of controlling register writes to a bank of physical registers.

FIG. 12 is a flow diagram showing a method of controlling which physical register to use for a register write by the register access control circuitry 44. At step 150 the register access control circuitry receives signals from the write back stage 40 indicating that a register write is required for an instruction specifying a given destination architectural register. At step 152 the register access control circuitry 44 determines whether there is any valid checkpoint pending (e.g. by checking valid bits associated with the checkpoint registers 48 or other state such as a transaction pending value maintained to indicate whether processing of a transaction is ongoing). If there is no valid checkpoint pending, then the system is currently in a non-checkpoint mode and at step 154 the result of the instruction is simply written to the physical register identified by the mapping storage element 46 as being mapped to the destination architecture specified by the instruction.

If there is a valid checkpoint pending, then the system is currently in a checkpoint mode, and at step 156 the register access control circuitry determines whether the physical register specified as mapping to the destination architectural register in the mapping storage element 46 equals the physical register specified for that same destination architecture register in the most recently updated checkpoint storage element 48. If there is more than one checkpoint storage element provided, then the most recently updated identifier 62 can be used to determine which checkpoint register to access. If at step 156 the physical register specified for the destination architectural register is the same in both the mapping storage element and the most recently updated checkpoint storage element, then at step 158 the result of the instruction is written to an available register that is not currently mapped to any architectural register by the mapping storage element 46 or any of the checkpoint storage elements 48 and at step 160 the current register mapping in the mapping storage element is updated so that the destination architectural register is mapped to the available register step 158. This ensures that the first register write to a given architectural register following the most recently captured checkpoint triggers a remapping of the physical register used for that destination architectural register, so as to preserve the previous value of the valid state to act as a checkpoint value stored in a different physical register to the one written to.

Alternatively, if at step 156 it is determined that the physical register specified for the destination architectural register is different in the mapping storage element 46 compared to the checkpoint storage element 48 that was most recently updated, then again at step 154 the result of the instruction is written to the physical register identified for the destination architectural register in the current register mapping specified by the mapping storage element 46. In this case there is no need to change the current register mappings. This scenario may arise if there has already been at least one register write to that destination architectural register since the most recently captured checkpoint was captured.

In summary, using a register mapper in an in-order processor to take checkpoints of register state reduces the delay between back to back transactions or retrying of the same aborted transaction, because it takes less time to copy the mapping information a it would take to copy all the register state. This improves performance and reduces power consumption.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   in-order processing circuitry to perform in-order execution of instructions;
   a predetermined number of physical registers for storing data for access by the in-order processing circuitry in response to architectural register specifiers specified by the instructions, wherein the predetermined number is greater than a number of architectural register specifiers in a set of architectural register specifiers that are specifiable by the instructions;
   a mapping storage element to store current register mapping information identifying, for each architectural register specifier of a subset of said set of architectural register specifiers, which physical register stores valid data corresponding to that architectural register specifier;
   control circuitry configured to update the register mapping information stored in the mapping storage element, in response to an instruction executed by the in-order processing circuitry during in-order execution of instructions, to change which physical register is specified as storing valid data corresponding to a given architectural register specifier; and
   at least one checkpoint storage element to store checkpoint register mapping information corresponding to a checkpoint of previous architectural state, the checkpoint register mapping information identifying, for each architectural register specifier of said subset, which physical register stores previous architectural state corresponding to that architectural register specifier.

2. The apparatus according to claim 1, wherein the control circuitry is responsive to a checkpoint capture event to set the checkpoint register mapping information of a selected checkpoint storage element to correspond to the current register mapping information stored in the mapping storage element.

3. The apparatus according to claim 2, in which the checkpoint capture event comprises execution of a transaction start instruction representing a start of a transaction comprising one or more instructions executed between the transaction start instruction and a transaction end instruction for which effects of the instructions of the transaction are to be committed when the transaction end instruction is reached in the absence of an abort event occurring between the transaction start instruction and the transaction end instruction.

4. The apparatus according to claim 2, in which the checkpoint capture event comprises a branch prediction or load value prediction being made to trigger speculative execution of instructions by the in-order processing circuitry.

5. The apparatus according to claim 1, wherein the control circuitry is responsive to a checkpoint restore event to set the current register mapping information stored in the mapping storage element to correspond to the checkpoint register mapping information of a selected checkpoint storage element.

6. The apparatus according to claim 5, in which the in-order processing circuitry is configured to support execution of a transaction comprising one or more instructions executed between a transaction start instruction and a transaction end instruction, for which effects of the instructions of the transaction are to be committed when the transaction end instruction is reached in the absence of an abort event occurring between the transaction start instruction and the transaction end instruction; and
the checkpoint restore event comprises the abort event occurring during processing of the transaction.

7. The apparatus according to claim 5, in which the checkpoint restore event comprises a branch misprediction or load value misprediction being detected.

8. The apparatus according to claim 1, wherein the control circuitry is configured to control writing of data to the physical registers in response to the instructions executed by the in-order processing circuitry.

9. The apparatus according to claim 8, in which:
in a non-checkpoint mode, the control circuitry is responsive to execution of an instruction specifying a destination architectural register specifier of said subset, to control a result of the instruction to be written to the physical register identified by the current register mapping information stored in the mapping storage element as storing the valid data for the destination architectural register specifier.

10. The apparatus according to claim 8, in which:
in a checkpoint mode, the control circuitry is responsive to execution of an instruction specifying a destination architectural register specifier of said subset, to detect whether the physical register specified for the destination architectural register specifier by the current register mapping information is equal to the physical register specified for the destination architectural register specifier by the checkpoint register mapping information stored in a most recently updated checkpoint storage element of said at least one checkpoint storage element.

11. The apparatus according to claim 10, in which:
in the checkpoint mode, when the physical register specified for the destination architectural register specifier by the current register mapping information is equal to the physical register specified for the destination architectural register specifier by the checkpoint register mapping information stored in a most recently updated checkpoint storage element of said at least one checkpoint storage element, the control circuitry is configured to:
control a result of the instruction to be written to an available physical register not currently mapped to any architectural register by the current register mapping information or the checkpoint register mapping information stored in any of said at least one checkpoint storage element; and
update the current register mapping information to specify the available physical register as the physical register storing the valid data corresponding to the destination architectural register specifier.

12. The apparatus according to claim 10, in which:
in the checkpoint mode, when the physical register specified for the destination architectural register specifier by the current register mapping information is different to the physical register specified for the destination architectural register specifier by the checkpoint register mapping information stored in a most recently updated checkpoint storage element of said at least one checkpoint storage element, the control circuitry is configured to control a result of the instruction to be written to the physical register identified by the current register mapping information stored in the mapping storage element as storing the valid data for the destination architectural register specifier.

13. The apparatus according to claim 1, wherein the current register mapping information comprises a plurality of mapping values each specifying, for a corresponding architectural register specifier of said subset, one of N alternative physical registers for storing the valid data for the corresponding architectural register specifier, where $N \geq 2$ and N is less than the predetermined number of physical registers; and
the checkpoint register mapping information comprises a plurality of mapping values each specifying, for a corresponding architectural register specifier of said subset, one of the N alternative physical registers for storing the previous architectural state for the corresponding architectural register specifier.

14. The apparatus according to claim 13, comprising $N-1$ checkpoint storage elements.

15. The apparatus according to claim 13, in which $N=2$.

16. The apparatus according to claim 1, comprising a plurality of checkpoint storage elements.

17. The apparatus according to claim 1, wherein the physical registers comprise at least $(M+(N-1)*R)$ physical registers, where M is the total number of registers in the set of architectural register specifiers, R is the number of registers in the subset of architectural registers, and $N \geq 2$.

18. The apparatus according to claim 1, wherein the subset of architectural register specifiers comprises all of the architectural register specifiers in the set of architectural register specifiers that are specifiable by the instructions.

19. An apparatus comprising:
means for performing in-order execution of instructions;
a predetermined number of means for storing register data for access by the means for performing in-order execution in response to architectural register specifiers specified by the instructions, wherein the predetermined number is greater than a number of architectural register specifiers in a set of architectural register specifiers that are specifiable by the instructions;

means for storing current register mapping information identifying, for each architectural register specifier of a subset of said set of architectural register specifiers, which means for storing register data stores valid data corresponding to that architectural register specifier;

means for updating configured to update the current register mapping information stored in the means for storing current register mapping information, in response to an instruction executed by the means for performing in-order execution during in-order execution of instructions, to change which means for storing register data is specified as storing valid data corresponding to a given architectural register specifier; and at least one means for storing checkpoint register mapping information corresponding to a checkpoint of previous architectural state, the checkpoint register mapping information identifying, for each architectural register specifier of said subset, which means for storing register data stores previous architectural state corresponding to that architectural register specifier.

20. A method comprising:
performing in-order execution of instructions;
in response to architectural register specifiers specified by the instructions, accessing register data from one of a predetermined number of physical registers, wherein the predetermined number is greater than a number of architectural register specifiers in a set of architectural register specifiers that are specifiable by the instructions;
storing current register mapping information identifying, for each architectural register specifier of a subset of said set of architectural register specifiers, which physical register stores valid data corresponding to that architectural register specifier;
in response to an instruction executed by in-order processing circuitry during in-order execution of instructions, updating the current register mapping information to change which physical register is specified as storing valid data corresponding to a given architectural register specifier; and
storing checkpoint register mapping information corresponding to a checkpoint of previous architectural state, the checkpoint register mapping information identifying, for each architectural register specifier of said subset, which physical register stores previous architectural state corresponding to that architectural register specifier.

* * * * *